(12) United States Patent
Johnson et al.

(10) Patent No.: US 7,104,532 B1
(45) Date of Patent: Sep. 12, 2006

(54) SHOCK ABSORBING ASSEMBLY FOR A BICYCLE

(76) Inventors: Christopher L. Johnson, 1018 Doster Rd., Plainwell, MI (US) 49080; James Jay Martin, 1913 Terryton Dr., Norman, OK (US) 73071

( * ) Notice: Subject to any disclaimer, the term of this patent is extended or adjusted under 35 U.S.C. 154(b) by 0 days.

(21) Appl. No.: 10/783,549

(22) Filed: Feb. 20, 2004

Related U.S. Application Data

(60) Provisional application No. 60/448,847, filed on Feb. 20, 2003.

(51) Int. Cl.
*B62J 1/02* (2006.01)
*B60G 11/02* (2006.01)

(52) U.S. Cl. ..................... 267/132; 267/36.1
(58) Field of Classification Search ........ 267/131–133, 267/36.1 X, 149, 40–48, 52, 160, 164, 260, 267/261, 229, 239, 244; 280/275, 276, 283, 280/284, 281.1, 288

See application file for complete search history.

(56) References Cited

U.S. PATENT DOCUMENTS

| | | | | |
|---|---|---|---|---|
| 624,269 A | * | 5/1899 | Voltz ..................... | 280/202 |
| 633,322 A | * | 9/1899 | Knapp ..................... | 267/132 |
| 2,503,106 A | * | 4/1950 | Fritz ...................... | 180/213 |
| 2,587,121 A | * | 2/1952 | Deardorff et al. ........... | 267/117 |
| 2,828,801 A | * | 4/1958 | Papst ..................... | 248/629 |
| 4,543,858 A | * | 10/1985 | Luck ...................... | 81/64 |
| 5,029,888 A | * | 7/1991 | Allsop et al. ............. | 280/281.1 |
| 5,242,184 A | * | 9/1993 | Nicholls ................. | 280/304.5 |
| 5,358,210 A | * | 10/1994 | Simon et al. ............. | 248/628 |
| 6,450,520 B1 | * | 9/2002 | Girard ..................... | 280/284 |

FOREIGN PATENT DOCUMENTS

EP          832810 A1  *  4/1998

* cited by examiner

*Primary Examiner*—Xuan Lan Nguyen
(74) *Attorney, Agent, or Firm*—Martin G. Ozinga; Phillips, McFall,McCaffrey, McVay & Murrah, P.C.

(57) ABSTRACT

A bicycle seat shock absorber comprising a shaft for attaching to a bicycle frame, a contoured flat spring having a first end and a second end wherein the first end is attached to the shaft, a support member having a first end and a second end wherein the first end is attached to the spring and the second end is attached to the bicycle seat, a flexible first strap having a first end and a second end wherein the first end is connected to the spring first end and the second end is connected to the spring second end, and a flexible second strap having a first end and a second end wherein the first end is connected to the shaft and the second end is connected to the support member second end.

5 Claims, 1 Drawing Sheet

SHOCK ABSORBING ASSEMBLY FOR A BICYCLE

CROSS-REFERENCE TO RELATED APPLICATIONS

Priority is claimed from provisional patent application U.S. Ser. No. 60/448,847, filed on Feb. 20, 2003, and incorporated by reference herein.

BACKGROUND OF THE INVENTION

1. Field of the Invention

In general, the present invention relates to a new and improved shock absorber assembly for vehicles. More particularly, the present invention provides a contoured "flat" spring made from composite materials which may be utilized in conjunction with a bicycle seat, with bicycle wheels, and other vehicles where a shock absorbing feature is desired.

2. Description of the Prior Art

With moving vehicles, such as bicycles, motorcycles, automobiles, and various other transportation and sports related vehicles, occupant comfort is often a key element in design. Minimizing the jarring of bumps and varied terrain during motion of the vehicle has been pursued through many various designs throughout vehicular history. In particular, this pursuit is extremely evident in the bicycle industry which is constantly increasing in consumer demand and the associated consumer desire for equipment that provides shock absorbing capabilities in normal and off road excursions.

It is felt that adequate suspension methods for bicycles have not been fully addressed. While many suspension systems exist and are utilized in bicycles, many of the designs are relatively limited, especially for rear suspension systems. Currently in the art, rear wheel suspension systems often are unnecessarily heavy, have too many associated parts, and greatly increase the price for bicycles.

A few seat post suspension systems are available for hard tail bicycles that help to offer cushion over bumps at relatively low expense. The systems that are currently available either use in-line damping mechanisms or polycentric devices with springs or elastomers for cushioning. These devices too may require additional maintenance due to moving parts, may result in stiction (sticking from overcoming friction), and may add additional weight to the bicycle. It is not unusual for a typical suspension system for a bicycle seat to weigh around 500 grams.

The above discussed limitations in the prior art is not exhaustive. The current invention provides an inexpensive, effective, and more reliable apparatus and method of using the same where the prior art fails.

SUMMARY OF THE INVENTION

In view of the foregoing disadvantages inherent in the known types of shock absorbing devices now present in the prior art, the present invention provides a new and improved shock absorbing assembly for use with bicycles. As such, the general purpose of the present invention, which will be described subsequently in greater detail, is to provide a new and improved shock absorbing assembly utilizing a contoured flat spring which may be fitted to existing bicycles which has all the advantages of the prior art devices and none of the disadvantages.

To attain this, the present invention essentially comprises a new contoured flat spring which will be discussed in greater detail below and which the terms "contour" and "flat" should not be considered limiting. In a preferred embodiment, the spring may have a first end attached to a bicycle frame or seat post and a second end for attaching to a bicycle seat, a tensioning or compression means or strap attached to the contoured flat spring, and a dampening means or strap. Furthermore, the present invention may be utilized in other vehicles other than bicycles such as but not limited to motorcycles, trucks, heavy equipment and so forth where an operator sits and desires shock absorbing qualities.

In another preferred embodiment, a supplemental damping means may be utilized with or without a travel-limiting strap. Another embodiment may use a damping mechanism, centrally located, to perform a travel limiting or top-out function. This same means can also be adjustable affixed in the seat post so spring preload can be modified.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in this application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception upon which this disclosure is based may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide a new and improved shock absorbing assembly which may be easily and efficiently manufactured and marketed.

It is a further object of the present invention to provide a new and improved shock absorbing assembly which is of a durable and reliable construction and may be utilized on multiple styles of vehicles including but not limited to bicycles.

An even further object of the present invention is to provide a new and improved shock absorbing assembly which is susceptible to a low cost of manufacture with regard to both materials and labor, and which accordingly is then susceptible to low prices of sale to the consuming public, thereby making such economically available.

Still another object of the present invention is to provide a new and improved shock absorbing assembly which provides all of the advantages of the prior art, while simultaneously overcoming some of the disadvantages normally associated therewith.

Another object of the present invention is to provide a new and improved shock absorbing assembly with relatively no or minimal moving parts, consistent performance in all temperatures, and provides relatively no or minimal rotation. Likewise, in a preferred embodiment, lateral translation and tilt may be incorporated to provide higher or better shock absorption wherein the movement will be subtle and firm with no perceptible slop as opposed to the disturbing slop in rotation from telescopic devices in the prior art.

An even further object of the present invention is to provide a new and improved shock absorbing assembly which allows lightweight design under 400 grams and a smooth fluid dampening movement and also capable of response to high amplitude hits.

Still another object of the present invention is to provide a new and improved shock absorbing assembly which may be adapted to existing bicycles using existing seat assemblies.

Yet another object of the present invention is to increase user comfort and decrease known medical risks associated with bicycle riding in general and in particular but not limited to nerve damage to male genitally and spinal column fatigue.

These, together with other objects of the invention, along with the various features of novelty which characterize the invention, are pointed out with particularity in the claims annexed to and forming a part of this disclosure. For a better understanding of the invention, its operating advantages, and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the drawings in wherein.

DETAILED DESCRIPTION OF THE PREFERRED EMBODIMENTS

Figure 1:
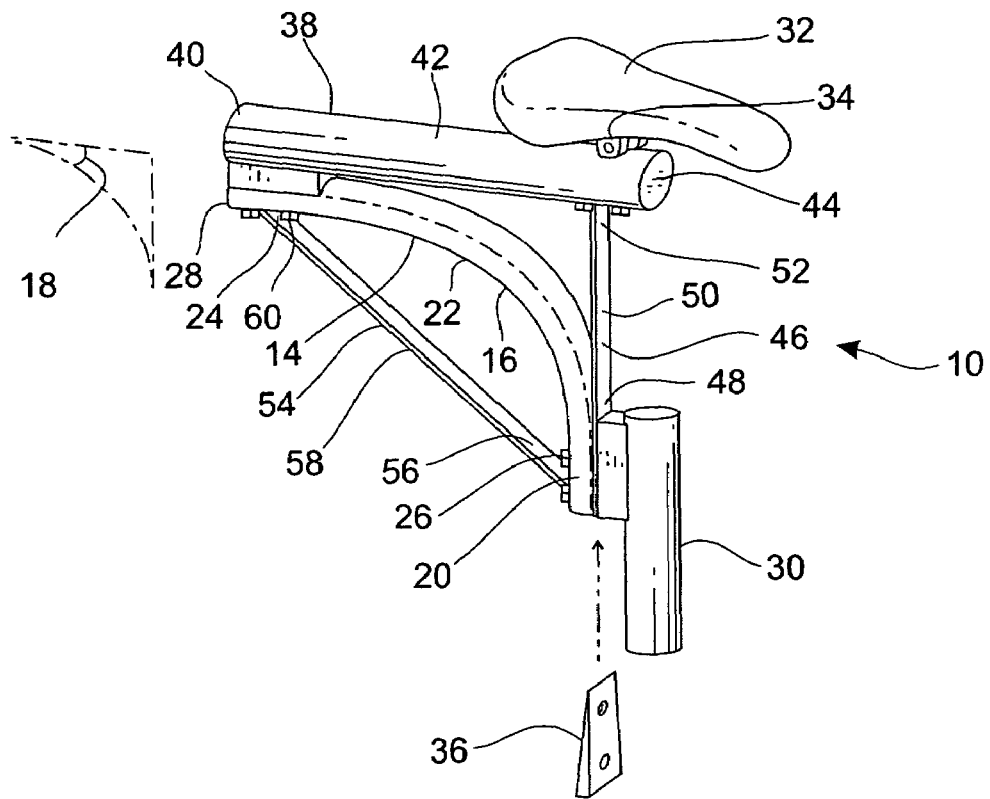
FIG. 1 is an illustration of the preferred embodiment of the invention placed on a seat post for a bicycle and including a seat portion.
Figure 2:
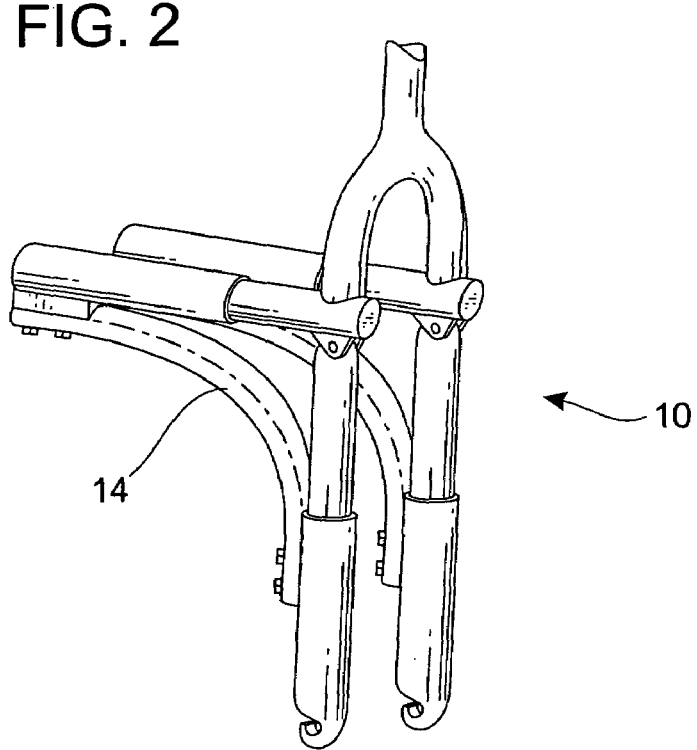
FIG. 2 is an illustration of a preferred embodiment of the invention placed on a front fork for a bicycle.

The following provides a damping system to be used with various moving vehicles, including but not limited to bicycles. In a preferred embodiment, it may be attached with the vehicles seat post, but may also be utilized at wheeled adjoining structures to provide cushioning, such as in conjunction with the front or rear wheel suspension mechanisms such as in line with a front suspension fork of a bicycle. Additionally, it may consist of additional damping means through a controlled mechanical and/or electromechanical device corresponding to sensor technology.

In a preferred embodiment the apparatus may consist of a tube on its distal end to line up with the seat post attachment of a bicycle. This device may be attached to the main strut, which in a preferred embodiment may arc up and to the posterior side at a given distance from the "in-line" direction of the seat post to the seat. Between the distal end of the main strut and the posterior end of the main strut may run a strap which prevents the main strut from bending forward during depression of the seat. The posterior proximal end of the main strut may attach to a rigid or semi-rigid proximal strut that may run forward in which the seat may attach to the anterior end, in relative "in-line" placement compared to the seat post attachment below.

The proximal strut, in a preferred embodiment, may be tubular in shape in order to achieve maximum rigidity to bending as well as lightweight, but may use other shapes as well. Between the seat post and the seat attachment may run another strap to prevent the main strut from bending too far backwards during depression of the seat. While the vehicle is moving, any jarring which travels up the vehicle toward the occupant will be dampened by the action of the main strut bending down and to the posterior, leaving the seat (and occupant) relatively stable. In a preferred embodiment, only one main strut may be used, however, it is possible to use more than one strut to achieve same effect. The straps may as well, in a preferred embodiment, be adjustable to place pretension on the main strut to allow more or less dampening of the main strut. This adjustability may be available through any sort of buckle, attachment point, ratchet mechanism, or other adjustable method. In a preferred embodiment, the straps may be made of a DACRON polyester, or other non-elastic material but may as well be made out of other methods as well. In a preferred embodiment, the seat post section as well as the proximal strut may be made of carbon fiber, titanium, aluminum or other lightweight, rigid, and durable material but may be fabricated from other materials as well. The anterior end of the proximal strut may utilize standard attachment methods for available seat mechanisms in a preferred embodiment. Each of the adjoining pieces may be attached with bolts, laminated in, screws, clamps, or other such attachment methods used to hold or affix the pieces together.

Additionally, the mechanism may be fabricated with additional components integrated into it or able to have components attached onto it, such as but not limited to: mudguard, light, reflector, luggage rack, or other related componentry. The main strut may be fabricated of carbon fiber, kevlar, Kevlar, or other laminates in a preferred embodiment in order to give a lightweight design, great durability, and dampening characteristics, but may as well be fabricated from, thermoplastics, metal, alloys, or other materials. This main strut along its arc, in a preferred embodiment, may generally be flat but may utilize varying curvature or contouring to additionally assist in providing the optimal material selection, weight requirements, and flexibility. Wedges may be used at the connection points between the main strut and the proximal strut as well as between the main strut and the seat post in order to alter the angle of the seat and main strut.

A hinged attachment method using hinges attached to the main strut and proximal strut with rigid segments between which are hinged together may be placed between the proximal strut and the main strut to prevent torque moments of the seat and proximal strut with relation to the seat post, via the main strut. In addition, a similar design may be used in conjunction with the front fork system on a bicycle or other wheeled vehicle as the damping mechanism for an in-line suspension fork or an in-line proximal damping mechanism from the fork as can be found on some Cannondale bicycles. Additionally, a similar method may be used in conjunction with the rear suspension apparatus on bicycle or other wheeled vehicles, again using a compressible strut to absorb the jarring of traversing uneven terrain. Another preferred construction in accordance with the current invention may consist of the main strut, seat post, seat post attachment point, proximal strut, proximal strut attachment point, seat, seat attachment point, anterior strap, posterior strap, and angle wedges.

The seat post is generally attached to the main strut by bolts, laminated in, or other attachment methods. The proximal strut is generally attached to the main strut by practiced attachment means used in the industry. The anterior strap is generally between the seat attachment point and the seat post attachment point while the posterior strap is generally between the seat post attachment point and the proximal strut attachment point. During damping of the mechanism, the main strut's compression is the damper of the experienced vibration or jarring. The straps generally maintain the appropriate positioning of the main strut with respect to the necessary ergonomical angle and position of the seat during compression of the main strut. The angle wedges may be placed at the seat post attachment point between the seat post and the main strut and/or at the proximal strut attachment point between the proximal strut and the main strut. The wedges, in a preferred embodiment may be made of a semi-rigid or rigid material with necessary holes for the attachment bolts to run through. They may as well be angled in varying degrees. It is understood that the system may be applied to a suspension fork of a bicycle.

Referring now to the drawings, wherein like reference numerals designate corresponding structure throughout the views, and referring in particular to FIG. 1, reference numeral 10 generally refers to a new and improved shock absorbing assembly, hereinafter referred to collectively as invention 10, in accordance with the present invention. Invention 10 as generally depicted is for use with bicycle 12 (not shown) although it is understood that invention 10 may be used on all types of vehicles wherein shock absorbing capabilities may be desired. It is understood that invention 10 may be generally directed to a composite contoured "flat" spring 14, which will be discussed in greater detail below, and may be utilized in numerous configurations wherein a superior spring may be desired in various mechanical applications. The embodiments described herein should not be considered limiting to just bicycles or vehicles. Likewise, invention 10 may be utilized in non-human operated systems wherein shock absorbing capabilities are desired, such as but not limited to suspension systems for bridges, buildings, and so forth.

In a preferred embodiment, flat spring 14 is fabricated from composite materials and pre-shaped into a contour or arc 16. The term "spring" should not be considered limiting or necessarily literal. It is understood that the arc 16 may be of numerous configurations with more or less of an angle 18.

In a preferred construction, a plaster, metal, alloy, or other type material mold of the general desired finished shape is constructed. A vacuum formed in resin, such as Orthocryl or other resins available in the industry for laminating purposes, may be applied to the built up layers of carbon tubular weave, Kevlar, kevlar carbon tubular weave, fiberglass, DACRON polyester, or other laminating materials may be layered over the plaster or other model. Alternatively, the lamination may take place also through pressure or heat treatment with or without vacuum to solidify them. Furthermore, the process for fabricating the spring section may come about through injection molding, milling, heat molding thermoset or thermoform plastics, pre-impregnated laminates, or other means. If laminates are used, these may be fabricated using the "I-beam" effect in construction—placing key layers of high-strength materials apart from one another within the lamination buildup—in order to optimize strength. They may be built up in layers or concentrically building around inner layers.

Of note, the general shape of spring 14 is formed during the construction process and, in a preferred construction, the compressed deflection alters the general shape to a relatively minor degree. Spring 14 may be of a relatively same shape whether spring 14 is compressed or loaded as to when non-compressed or unloaded. A preferred embodiment of spring 14 comprises a first end 20, a middle segment 22, and second end 24. As generally depicted in the figures, spring 14 is shown under some load or compression which will be discussed in greater detail below. Furthermore, spring 14 may be of numerous configurations such as but not limited to the illustrations generally depicted.

In a preferred construction, spring 14 should be relatively stiff enough to prevent rotational twisting. It may be contemplated that spring 14 construction would allow for a desired rotational twisting if such would be desired and constructed accordingly.

In accordance with a preferred construction, spring 14 first end 20 may be generally secured to first attachment point 26 and wherein second end 24 may be secured to second attachment point 28. As generally depicted in FIG. 1, first attachment point 26 may be permanently or removably connected to shaft 30. Typically, production bicycles normally have a seat affixed to the top of a supporting shaft that is insertable into a vertically extending tube of the bicycle framework. It is contemplated that shaft 30 may be used with commercially available tubes of existing bicycle frameworks although not limited to such.

Spring 14 second attachment point 28 may be utilized to permanently or removably secure seat 32. It is understood that seat 32 may be included in invention 10 or provided separately. Furthermore, invention 10 may utilize existing connectors, configurations, and assemblies found with existing production bicycle seats. Seat 32 may include pivot 34 for adjusting the relative angle of seat respective to bicycle 12. It is further contemplated, invention 10 may include angled wedge 36 which will be discussed in greater detail below.

In a preferred construction, seat 32 removably connects to support member 38 and wherein support member 38 connects permanently or removably to spring 14 second attachment point 28. Support member 38 may have adjustable or multiple configurations to attach seat 32. Support member 38 may comprise a first end 40, a middle segment 42, and a second end 44. In a preferred embodiment, support member 38 first end 40 attaches to spring 14 second attachment point 28 and seat 32 may be generally found attached to support member 38 second end 44. Once again, it is understood that multiple configurations may be achieved wherein seat 32 may be connected to various points along support member 38. Further, it is contemplated that seat 32 may be attached directly to spring 14 and support member 38 not be utilized.

Support member 38 and shaft 30 may be made of numerous materials such as but not limited to plastics, composite materials, metal, and so forth. In a preferred construction, shaft 30 and support member 38 may be made from light weight composite tubes. In a preferred construction, light weight materials may be utilized that are known to have relatively strong features for supporting the desired weight. It is also understood that material selected may be of a quality to allow bending, compression, or flexibility. Furthermore, it is contemplated that support member 38 may bend to provide the function of shock absorbing. Likewise, it is contemplated that a bendable support member 38 may work in conjunction with spring 14 to provide shock absorption.

It is further contemplated that spring 14 may be constructed such that it incorporates shaft 30. Still furthermore, spring 14 may be constructed such that support member 38 may be incorporated into spring 14.

As mentioned above, wedge 36 may be utilized. In a preferred construction, seat 32 may not include pivot 34. In such a construction, it may be desirable to alter the relative angle of seat 32 in respect to bicycle 12. Wedge 36 may be of multiple angles and configurations that allow a selectively alterable angle of seat 32 wherein shaft 30 is still generally vertically connected to bicycle 12 but seat 32 may be of a selective angle in relation to bicycle 32. Wedge 36 may be utilized between shaft 30 and spring 14 first end 20 or first attachment point 26. It is understood that the above description of wedge 36 placements should not be considered limiting.

In accordance with a preferred construction of invention 10, a first flexible strap 46 may be utilized. Although it is contemplated that multiple and various construction may be utilized, in a preferred embodiment, first strap 46 may generally allow for a preloading of spring 14 such that spring 14 first end 20 and second end 24 are connected by first strap 46 and tension created between as first strap 46 pulls first end 20 relatively closer to second end 24. This tensioning generally compresses spring 14 to a desired amount while allowing for further compression. First strap 46 may further prevent spring 14 from losing its pre-desired compression or spring pre-load. Accordingly, first strap 46 may allow spring 14 second end 24 to travel in a relatively downward motion, bending spring 14 as external load is applied, and prevents spring 14 second end 24 from relatively moving upward past its start position of arc 16, unbending spring 46 greater than angle 18 when the external load is decreased or removed. First strap 46 may comprise a first end 48, a middle segment 50, and a second end 52 wherein first end 48 permanently or removably attaches to spring 14 first end 20 and second end 24 respectively. A general damping may be achieved by limiting the amount of deflection, travel, or movement of spring 14. First strap 46 may contain the spring 14 during compression modifying the curvilinear spring dynamics and the travel curve or seat 32 excursion profile.

In another preferred embodiment, a second flexible strap 54 may be utilized. Second strap 54 may comprise a first end 56, a middle segment 58 and a second end 60. Second strap 54 first end 56 may connect permanently or removably to shaft 30, to spring 14 first end 20, or both. Second strap 54 second end 60 may connect permanently or removably to seat 32, support member 38 or both. It is contemplated that second strap 54 will allow spring 14 to compress wherein shaft 30 moves closer to seat 32 and support member 38, but prevents shaft 30 from moving farther apart or away from seat 32 and support member 38 than selectively desired. A general damping may be achieved by limiting the amount of deflection, travel, or movement of spring 14. The spring 14 may be constrained from rebound over travel by second strap 54 or "top-out".

First strap 46 and second strap 54 may be made from nylon, DACRON polyester, but is not limited to such. Other convention materials may be used which allow for flexing when contracted or tension removed and yet have a predetermined or set extension length. It is contemplated that use of straps may gain spring preload, constrain over travel, and modify the motion characteristics such as but not limited to the curve of the arc of travel of the seat.

In accordance with a preferred embodiment of the invention, further dampening means known in the art may be utilized. Invention 10 may include conventional and unconventional shock absorbers with or without straps. It may further include electronic forms known in the art with or without using feedback sensors.

Furthermore, materials may be utilized or formed of any material available to those of ordinary skill in the art, such as a thermoplastic thread material. When thread is included in an intermediate layer, it preferably includes an elastomeric, polymeric material. Exemplary polymers include polyisoprene, polyether urea, such as LYCRA, polyester urea, polyester block copolymers such as HYTREL, isotactic-poly(propylene), polyethylene, polyamide, poly(oxymethylene), polyketone, poly(ethylene terephthalate) such as DACRON, poly(acrylonitrile) such as ORLON, and trans-diaminodicyclohexylmethane and dodecanedicarboxylic acid. LYCRA, HYTREL, DACRON, KEVLAR, and ORLON are available from E.I. DuPont de Nemours & Co. of Wilmington, Del. Still furthermore, a fabric is selected from the group consisting of stretch fabric, textured fabric, DACRON polyester, nylon, polyester, cotton, kevlar, and mixtures thereof may be utilized. A polyester multifilament yarns may also be used.

Changes may be made in the combinations, operations, and arrangements of the various parts and elements described herein without departing from the spirit and scope of the invention.

We claim:

1. A shock absorber for dampening motion between a bicycle seat post and a bicycle seat comprising:
    a flat spring formed into an arc shape, said spring having an upper spring end and a lower spring end located at opposite distal ends of said spring, wherein said lower spring end is configured for attachment to said seat post;
    a longitudinally extending support member configured to support said seat comprising a first support end and a second support end located at opposite distal ends of said support member, wherein said first support end is attached to said upper spring end;
    a first flexible strap having a first end attached to said upper spring end and said first flexible strap having a second end attached to said lower spring end; and
    a second flexible strap having a first end attached to said lower spring end and said second flexible strap having a second end attached to said second support end, wherein said second flexible strap is oriented substantially perpendicular to said support member.

2. The shock absorber of claim 1 wherein said flat spring is made from composite materials.

3. The shock absorber of claim 2 wherein said composite material includes resin.

4. The shock absorber of claim 2 wherein said composite material includes a carbon tubular weave.

5. The shock absorber of claim 2 wherein said composite material includes fiberglass.

* * * * *